United States Patent
Rowse et al.

[11] Patent Number: 5,873,197
[45] Date of Patent: Feb. 23, 1999

[54] SEED PRIMING

[75] Inventors: Hugh Robert Rowse; John Michael Terence McKee, both of Warwick, England

[73] Assignee: British Technology Group Limited, London, England

[21] Appl. No.: 809,104
[22] PCT Filed: Sep. 15, 1995
[86] PCT No.: PCT/GB95/02188
  § 371 Date: Mar. 17, 1997
  § 102(e) Date: Mar. 17, 1997
[87] PCT Pub. No.: WO96/08132
  PCT Pub. Date: Mar. 21, 1996

[30] Foreign Application Priority Data

Sep. 16, 1994 [GB] United Kingdom .................. 9418763

[51] Int. Cl.⁶ ..................................................... A01C 1/02
[52] U.S. Cl. ............................ 47/58; 47/16; 47/61; 47/77
[58] Field of Search .................... 47/58, 16, 61, 47/77

[56] References Cited

U.S. PATENT DOCUMENTS 4,043,903  8/1977  Dor .
5,119,589  6/1992  Rowse .

FOREIGN PATENT DOCUMENTS

A 4 807 030  1/1980  Netherlands .
A 1 648 291  5/1991  Russian Federation .

OTHER PUBLICATIONS

Rowse et al, "A Model of seed germination".
Flyfield et al, "Effects of Temperature and Water Potential on Germination . . . " Journal of Experimental Botany, vol. 40, No. 215, pp. 667–674 (1989).

*Primary Examiner*—L. Blainf Lankford
*Attorney, Agent, or Firm*—Nixon & Vanderhye

[57] ABSTRACT

A method for treating plant seed is provided comprising contacting them with a first surface of semi-permeable membrane having first and second surfaces, the second surface being in direct contact with a solution of predetermined osmotic potential, whereby the seeds abstract water from the solution through the membrane, wherein the seed and semi-permeable membrane are constantly or periodically caused to move relative to each other such as to constantly or periodically reorient the seed with respect to the first surface such that the transfer of water occurs evenly over substantially the entire surface area of the seed. For seed priming the osmotic pressure and the period for which the seeds are maintained in contact with the membrane are sufficient to allow pre-germinative metabolic processes to take place within the seeds up to a level limited to that immediately preceding radicle emergence. Methods for germinating seed and inducing desiccation tolerance in seed are also provided. Preferably the semi-permeable membrane is provided in the form of a tube of circular or polygonal cross-section which is rotated with the seeds on its inner surface and the solution retained between its outer surface and a further body to which the membrane is sealed in a watertight manner.

31 Claims, 4 Drawing Sheets

SEED PRIMING

The present invention relates to a method of treating seeds by controlling their water content, particularly to priming and/or germinating seeds or inducing desiccation tolerance in them. The invention further provides seeds primed, germinated or made desiccation tolerant by the method of the invention and to an apparatus for performing the method.

Seed priming is a process for treating plant seeds that enables them to undergo faster and more uniform germination on sowing or planting, with the option of simultaneously treating them with fungicide or other preservatives providing protection during processing or after sowing and allowing their prolonged storage, e.g. in packets displayed at point of sale.

This process allows the seeds to absorb enough water to enable their pre-germinative metabolic processes to begin and then arrests them at that stage. The amount of water absorbed must be carefully controlled as too much would simply allow the seed to germinate and too little would result in the seed ageing. Once the correct amount of water has been absorbed it is then necessary to hold the seed at that water content for a period, typically one to two weeks, before drying it back to the original water content for storage. When subsequently sown the seeds usually germinate more quickly and uniformly than natural unprimed seeds and, where the geographical situation of the point of priming allows, the seeds can be sown directly after priming without drying whereupon they germinate even faster than those which have been primed and dried.

The conventional way of priming seeds has been to immerse them in an aerated solution of an osmotic material, usually polyethylene glycol (PEG). The seed coat is more or less semi-permeable to PEG such that the osmotic potential of the seed tends to equilibrate with that of the solution; the PEG concentration being chosen such that it will not allow seed to absorb enough water to germinate. This works well for many species but the priming of large quantities of seed requires large quantities of PEG solution and this can cause disposal problems, particularly if fungicides have been added. Immersion in liquid also restricts oxygen absorption and some seeds, particularly onions, will only prime satisfactorily if the solution is aerated using air enriched with oxygen.

To avoid the problems of large scale priming with PEG the system known as 'drum priming' was devised (see U.S. Pat. No. 5,119,598=GB 2192781). This involves first carrying out tests on a seed lot to determine the optimum level of hydration and then hydrates the bulk of seeds in a drum which is slowly rotated about its horizontal longitudinal axis. Water is added to the drum more slowly than the seeds are able to absorb so that they become hydrated without ever appearing to get wet. The seeds are next incubated in a revolving drum with access to air for a period appropriate to their type before drying.

An alternative method of priming seeds is known as 'matrix priming' and does not involve the use of PEG but utilises an absorbent medium such as clay or peat to absorb water and then transfer it to the seeds (see U.S. Pat. No. 4,912,874). The extent of seed hydration is controlled by altering the water content of the medium and the medium/seed ratio. The process is completed by removal of seed from the medium with optional drying. Both drum and matrix priming have been developed to avoid the problems of using PEG when priming large quantities of seed.

Further seed treatments involving control of seed water content are germination and desiccation tolerance induction treatments. Treatment for producing germinated seeds may involve treatment similar to priming as described above with treatment being continued until the radicle emerges. Seed so produced may be further dried back and/or coated as described in U.S. Pat. No. 4,905,411. Separation of the germinated seed from primed seed may be carried out using a seed classifier operating to separate seeds showing signs of radicle emergence from those that do not. Such apparatus and method are exemplified by the disclosure of Kirin Brewery Co Ltd JETRO May 1994 where a video CCD camera is used to observe seed for colour and size of tissue and a compressor device is used to move selected developed seed from undeveloped seed. Treatment for induction of desiccation tolerance in seed with emerged radicles is exemplified by WO 94/05145 wherein the content of the seed is held between 35 and 55% weight such that the emerged radicle does not develop while other metabolic processes continue.

The present invention provides a further method and apparatus for controlling the water content of seeds that does not require constant active addition of water, as required in conventional drum priming, but utilises a semi-permeable membrane to mediate the transfer of water from a solution of set osmotic pressure to the seed. The use of this method allows for the set up of automated forms the apparatus for performing the method. The invention also concerns itself with requirements of treating small quantities of seeds simultaneously in multiple lots, such as required when priming high value flower seeds of different varieties, with the advantages of drum priming over matrix priming with respect to separation of seeds post treatment.

Particular advantages are provided in using the present method and apparatus to treat seeds having mucilaginous coats, for example those such as Pansy and Salvia seeds; and especially to prime such seeds. These seeds do not respond well to other water treatment methods, eg. priming methods, as the mucilage layer becomes swollen with water and restricts gas exchange necessary for pre-germination and seed development.

Semi-permeable membrane apparatus has been reported as being used for modeling water stress on seed germination in a seedbed (see Rowse et al (1986) Rep. Natn. Veg. Res. Stn. for 1985) wherein seeds were germinated between a ceramic plate and a semi-permeable bag of PEG solution, with further development by Fyfield et al (1989) J. Experimental Botany, Vol. 40, no 215, pp667–674. This latter work was not directed at production of seed for drying back and/or packaging but concerned itself with determining the ideal conditions for radicle emergence in mungbean seeds.

In a first aspect of the present invention there is provided a method of treating a seed to effect control of its water content comprising contacting the seed with a first surface of a semi-permeable membrane having first and second surfaces, the second surface being in direct contact with a solution of predetermined osmotic potential such that the seed abstracts water from the solution through the membrane, wherein the seed and semi-permeable membrane are constantly or periodically caused to move relative to each other such as to constantly or periodically reorient the seed with respect to the first surface such that the transfer of water occurs evenly over substantially the entire surface area of the seed.

In a preferred method of the first aspect of the present invention their is provided a method for priming or germinating or inducing desiccation tolerance in a seed wherein the solution of predetermined osmotic pressure is such as to allow the seed to abstract water from it through the semi-permeable membrane; the period for which the seed is treated being sufficient to allow pre-germinative metabolic processes to take place within the seed up to any level including that immediately preceding radicle emergence for priming, up to radicle emergence for germination and being insufficient to support radicle growth but sufficient to allow other metabolic processes to continue in the case of desiccation tolerance induction.

Preferably the seeds and semi-permeable membrane are caused to move relative to each other such that the seeds are constantly reorientated with respect to the first surface whereby they take up water evenly over their entire surface areas, this particularly being effected by causing the seed to roll or tumble across the membrane. More preferably the semi-permeable membrane is provided in the form of a tube, e.g. of polygonal or circular cross-section, and this tube is rotated with the seeds on its inner surface and the solution retained between its outer surface and a further body, to which the membrane is sealed in a watertight manner or of which the membrane is an integral part.

The semi-permeable membrane is such that, when the second surface (i.e. the tube outer surface) is contacted with solution, the first surface (i.e. the tube inner surface) appears to be dry. It is preferred that only the contact of the seed, or some other intermediate absorbent body, with the first surface results in the transfer of water from the second surface. To facilitate retention of the seed within the confines of the tube of semi-permeable membrane in use, it is preferred to use the tube format with retaining elements, eg. caps placed at each end.

Most preferably the semi-permeable membrane is located on a frame within a drum device such that it divides the drum device into inner and outer chambers which are isolated with respect to water transfer between the two other than through the semi-permeable membrane itself. The second chamber preferably is completed by one or more other non-permeable wall elements, preferably including that/those upon which the semi-permeable membrane tube is mounted.

The semi-permeable membrane may be made from any material that is permeable to water but impermeable to the solution of predetermined osmotic pressure. Conveniently membranes are those of cellulose and/or polycarbonate materials, with fungicide addition to the solution being potentially necessary where cellulose membranes are used to prevent fungal growth on the membrane. Suitable types of membrane include that used for dialysis, e.g. for visking dialysis.

When formed into a tube the membrane may take any cross-sectional form but conveniently may be a simple form of, eg. circular or polygonal eg. square or hexagonal nature. The rate at which this tube is rotated with the seed held in its inner volume will vary with its diameter. The speed should be sufficient to effect the reorientation of the seed with respect to the surface, with no particular limitation being intended. Typically this is about 0.8 to 1.2 rpm for a 110 mm diameter unit.

The priming conditions with respect to osmotic potential will vary from seed to seed with solutions providing between −0.5 to −2.0 MPa osmotic potential typically being used for priming or germinating. Suitable osmotic potential for stressing seed to induce desiccation tolerance will be determined by simple bench experimentation, but will be such as to produce a seed water level sufficient to inhibit radicle growth but sufficiently high to permit other metabolic processes to continue, eg.providing a water content of 35 to 55% by weight of the seed. Preferred conditions will be consistent with those disclosed in WO 94/05145.

The preferred temperature at which the method of the invention is carried out may vary with the seeds to be treated, but is typically between 10° and 25° C., more preferably between 15° and 20° C., for priming and desiccation tolerance induction, and optionally up to as much as 40° C. for germination. Such temperature control is conveniently achieved by carrying out rolling of the tube within a drive frame mounted within a temperature controlled environment, e.g. in a temperature controlled room.

Using the preferred tubular membrane method of the present invention wherein inner and outer chambers contain a number of seeds and solution of predetermined osmotic potential respectively, advantages are provided wherein seeds are constantly mixed such that equal access to the water supplying membrane is offered, the osmotic solution (e.g. aqueous PEG solution) is constantly agitated or stirred to minimize concentration gradients that would otherwise build up as water is taken across the membrane, and temperature gradients are prevented which might otherwise allow pure water to distil onto cooler parts of the unit and thus allow seed to take up too much water at one contact point.

In a second aspect of the present invention there is provided apparatus for performance of the method of the invention, this comprising a semi-permeable membrane having first and second surfaces, the first surface being adapted to be in contact with a seed to be treated in use, the second surface being located in a chamber adapted to contain a solution of predetermined osmotic potential in contact with the second surface such that in use the seed is able to abstract water from the solution through the membrane wherein the apparatus is adapted such that in use the first surface and seed may be caused to move relative to each other such that the seed is periodically or constantly reorientated with respect to the first surface whereby the transfer of water takes place evenly over its entire surface area.

The semi-permeable membrane is preferably provided in the form of a tube of circular or polygonal cross-section which is rotatable such as to be capable of carrying the seed on its inner surface with the solution retained in the chamber which is formed between its outer surface and a further body to which the membrane is sealed in a watertight manner. The relative movement of the first surface and the seed preferably induces rolling and tumbling motion of the seed across the surface.

Preferably the semi-permeable membrane is such that, when the tube outer surface is contacted with solution, the tube inner surface appears to be dry, particularly wherein only the contact of the seed or some other absorbent body with the first surface results in transfer of water to the first side. The tube is conveniently provided with end caps. Most conveniently the semi-permeable membrane is located on a support frame, eg. a tubular frame, within a drum device such that it divides the drum device into inner and outer chambers which are isolated with respect to water transfer between the two other than by through the semi-permeable membrane itself. In such an embodiment the outer chamber is conveniently completed by other non-permeable wall elements including those upon which the semi-permeable membrane tube is mounted. The semi-permeable membrane is made from any material that is permeable to water but impermeable to the solution of predetermined osmotic pressure. Preferably the semi-permeable membrane is made from cellulose and/or polycarbonate material suitable for dialysis.

In a particularly preferred embodiment of the invention the tube is mounted with its longitudinal axis substantially horizontally oriented in a drum device which is in turn mountable in a roller frame such that it may be driven to rotate and thus cause the tube to rotate about its longitudinal axis. Thus a preferred embodiment of the second aspect of the present invention provides the apparatus described above together with a means for rotating it about its horizontally oriented longitudinal axis, this drive means preferably comprising a power driven roller frame.

It will be realised by those skilled in that art that the individual seeds, when applied in quantity to the chamber formed by the membrane inner surface, may not abstract their water directly from the semi-permeable membrane but from adjacent seeds. As long as such seeds are periodically or continuously reorientated such that even water distribution is achieved such mechanism is contemplated as suitable for the purposes of the present invention. Thus no limitation is intended on the method of action on all of the seeds, other than one or some of the seeds at least should directly contact the membrane.

The method, apparatus and seeds of the invention will now be described by way of illustration only by reference to the non-limiting Figures and Examples below. Further embodiments falling within the scope of the invention will occur to those skilled in the art in the light of these.

FIGURES

EXAMPLE 1

Figure 1:
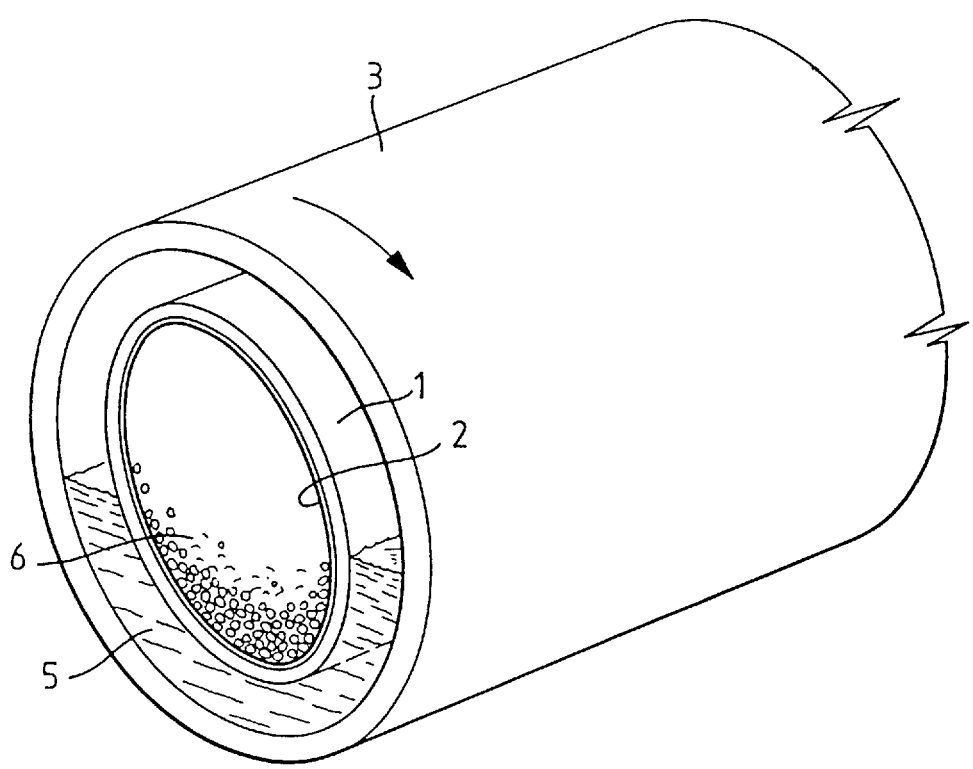
FIG. 1 shows a cutaway perspective view of a drum mounted membrane apparatus according to the present invention as described in Example 1.
Figure 2:
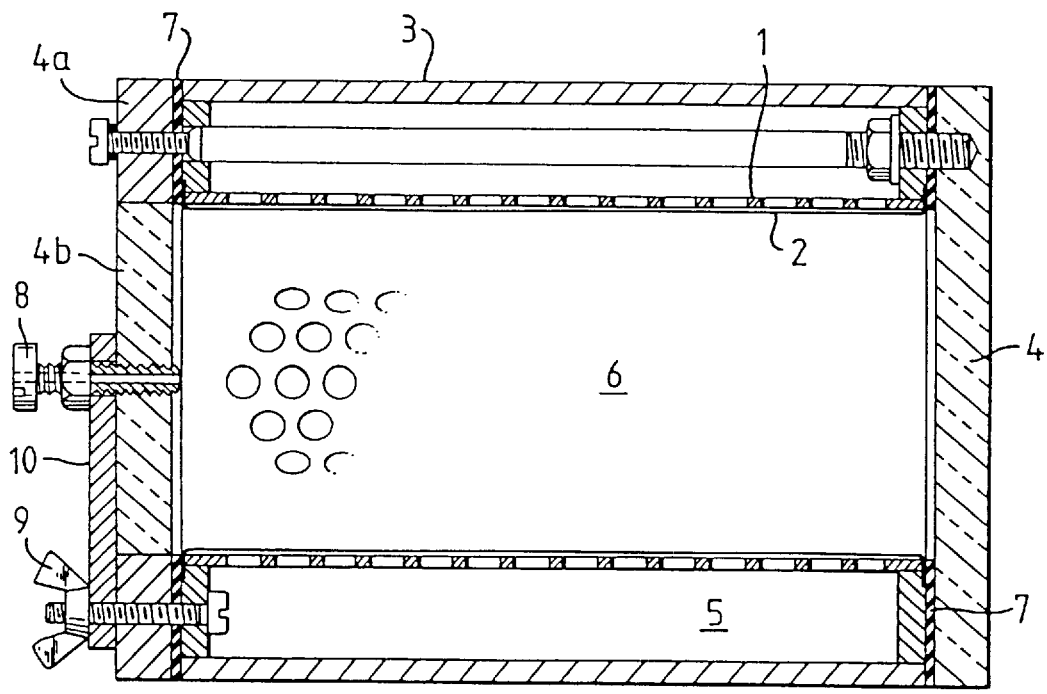
FIG. 2 shows a cross-sectional view, as viewed from the side, of the drum mounted membrane apparatus shown in FIG. 1.
Figure 3:
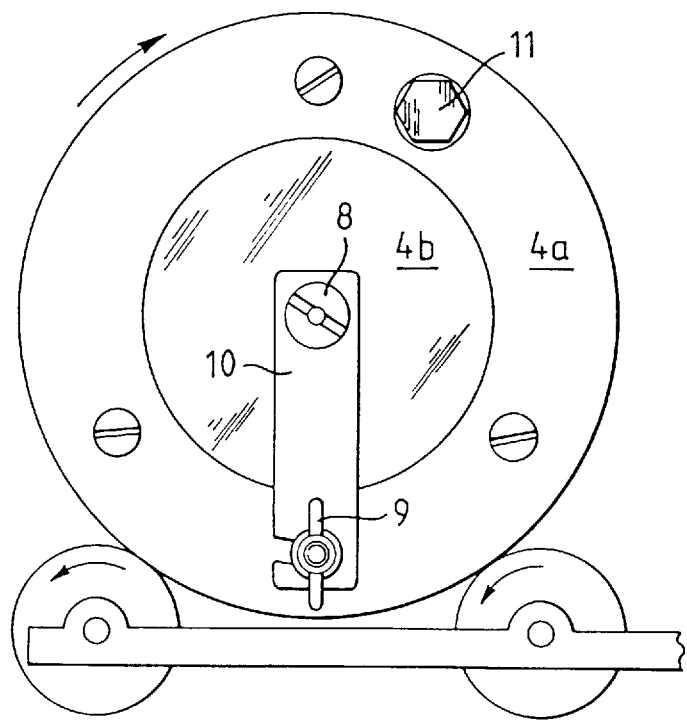
FIG. 3 shows an axial end view of the drum mounted membrane apparatus of FIG. 1 as mounted for rotation on a driven roller frame.

Apparatus of the invention:

A priming apparatus of the invention as shown in FIGS. 1 to 3 consists of a drum formed of two concentric cylinders; an inner PVC cylinder (1) being a rigid and highly perforated tube on which a flexible semi-permeable membrane tube (2) is supported in use, and an outer unperforated PVC cylinder (3). Perspex closures (4) are provided at either end of the inner cylinder and seal a solution of set osmotic potential into the chamber (5), formed between the outer cylinder (3) and the membrane (2), and retain seed in the inner chamber (6), with the interface provided by 2 mm sheet rubber gaskets (7). Seeds are placed in chamber (6) formed by the inner surface of the membrane (2). Membrane (2) is a tubular visking dialysis membrane with its diameter matched to that of chamber (6) and made from cellulose; this being supplied by Medicell International Ltd., 239 Liverpool Road, London N1 1LX, UK. For enabling rotation of the membrane relative to the seeds in use the drum is mounted upon a roller frame (Bellco cell production roller apparatus) using rubber rollers. Three sizes of drum of the invention are provided for use in this frame, each having a different capacity for seeds; 25 g capacity being 64 mm diameter by 58 mm length; 50 g capacity being 64 mm diameter by 144 mm length and 100 g capacity being 81 mm diameter and 210 mm length; all being inner cylinder dimensions. The inner cylinder is fixed in place in the outer cylinder via the fixed end cover (4a) and removable end cover (4b) retained by a screw (8), bar (10) and wing nut (9). Screw (11) allows access to chamber (5) for replenishing water content of the solution while screw (8) has a central passage allowing transfer of respiratory gases to and from the atmosphere.

EXAMPLE 2

Alternative apparatus of the invention.

Figure 4:
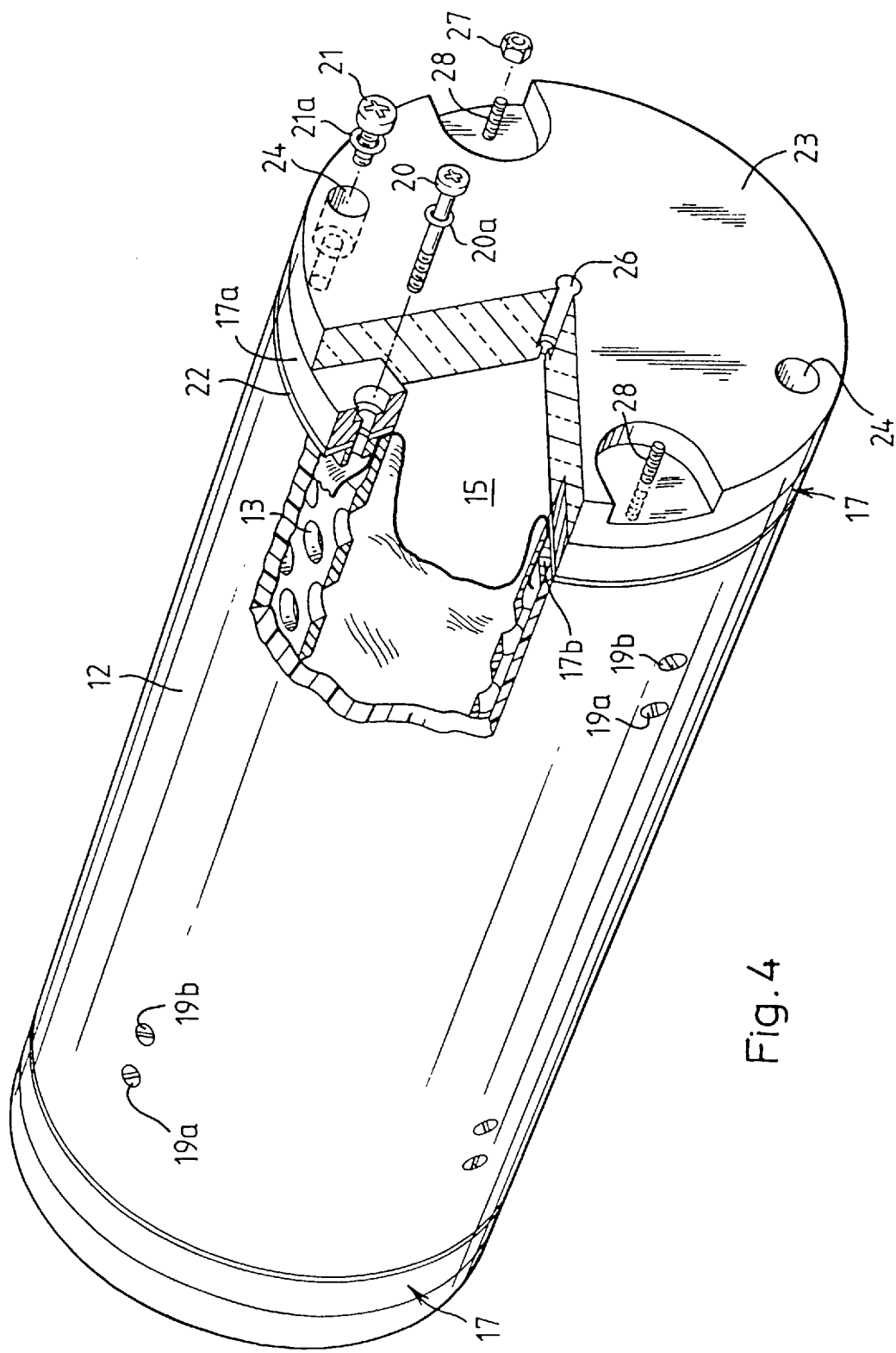
FIG. 4 shows a cutaway perspective view of the alternative embodiment of the apparatus of the invention of Example 2.
Figure 6:
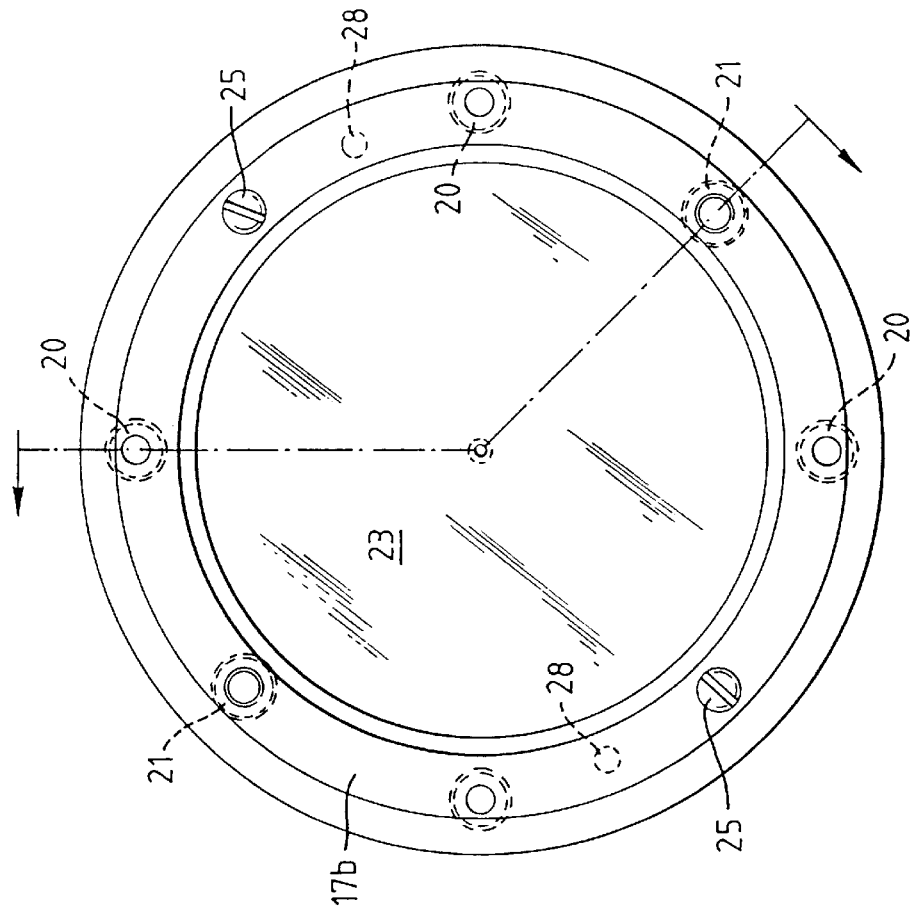
FIG. 6 shows a view of the closure and annuli of the apparatus of Example 2 as viewed in the direction of the arrows provided in FIG. 5.
Figure 5:
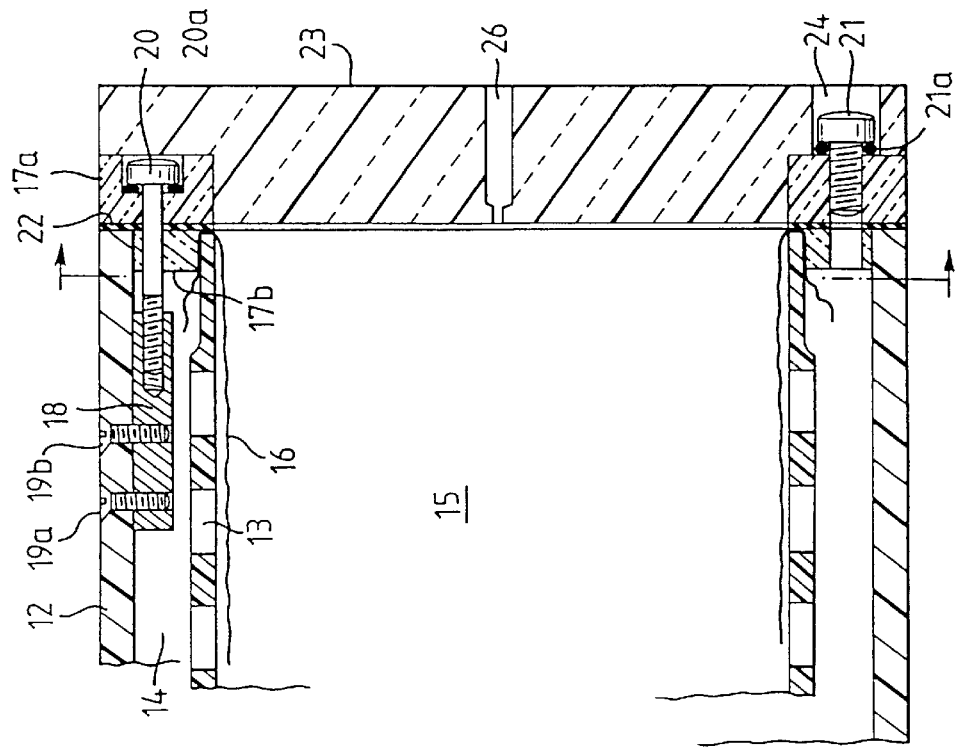
FIG. 5 shows a cross-section through the end of the apparatus of Example 2 as viewed with the longitudinal axis horizontally oriented.

An alternative arrangement of an apparatus of the invention is shown in FIGS. 4 to 6. In FIG. 4 an outer PVC cylinder (12) and inner perforated PVC cylinder (13) define between them an outer chamber (14) which is separated from an inner chamber (15) with regard to liquid flow by a semi-permeable membrane tube (16) sourced as described in Example 1.

The inner cylinder is mounted in relation to the outer cylinder by way of two part perspex annuli (17) which are in turn mounted on the outer cylinder (12) via intermediate mounting elements (18) and screws (19a, 19b, 20); the presence of two screws (19a and 19b) affixing elements (18) to the cylinder inhibiting movement of the element out of axial alignment with screws (20). Screws 20 carry o-rings (20a). The annuli consist of front plates (17a) with back plates (17b) screwed onto them by screws (25) with annular sheet rubber gaskets (22) held between the two. Solution of predetermined osmotic potential is added to chamber (14) through one or both of two orifices plugged in use by screws (21) having o-ring seals (21a) about their shanks. These screws are accessed through throughholes (24) in end closures (23) The sheet rubber gaskets (22) reside between the annuli and the outer and inner cylinders (12) and (13) at each end of the apparatus for preventing leakage of solution from the chamber. The semi-permeable membrane (16) is held taught across the inner cylinder between the gaskets and the cylinder (13). The inner chamber (15) is closed by the perspex closures (23) at each end; these being retained in place by nuts (27) which engage threaded metal lugs (28) projecting from the annuli or similar threaded mountings which releasably attach them to the annuli at each end. At least one of the closures (23) has an air hole allowing passive exchange of respiratory gases between chamber (15) and the atmosphere.

EXAMPLE 3

Priming method of the invention:

A number of drum devices of Example 1 or 2 were filled to between 33% and 50% of the volume of outer chamber (5, 14) with aqueous solutions of PEG (molecular weight 20,000) to give osmotic strengths of between −0.6 and −1.9 MPa as appropriate. The respective chambers (6, 15) were filled with amounts of seeds dependent upon the capacity given in Example 1 and the ends sealed with the closures (4, 23) mounted on the gaskets (7, 22). The drums were placed with their outer cylinder side surfaces on the rollers of a Bellco cell production roller apparatus (see FIG. 3) in a temperature controlled room at 15° C. and rotated at 0.8 rpm for periods as described in the Table 2 below.

The water activity of the PEG solution was measured indirectly at set intervals, e.g. once a day, by weighing without seeds to determine the change in water content of the outer chamber and adding water to restore the original weight and thus osmotic pressure exerted. A computer program was used for operating numbers of units simultaneously which recorded details of each drum unit and controlled a peristaltic pump to add correct amounts of water; water potential changes being automatically recorded.

The results obtained using this protocol are illustrated in Tables 1 and 2: Table 1 giving the priming conditions used for a range of seeds using the method of the present invention and Table 2 giving results of germination tests for these and 'natural', ie. unprimed seeds.

seed, which has limited shelf life as for some species this produces faster and more uniform germination. The performance of these seeds is also given in Table 2.

Drying back after priming was carried out using standard techniques well known to those skilled in the art where required.

TABLE 2

Results of germination tests on seeds primed using MPa and times set out in Table 1:

| Species Cultivar | Germ Temp °C. | Natural Seed | | | Primed Fresh | | | Primed Dry | | |
|---|---|---|---|---|---|---|---|---|---|---|
| | | % Germ | Days * | SD | % Germ | Days * | SD | % Germ | Days * | SD |
| Coriander | | 89.8 | 5.3 | 3.5 | 100.0 | 0.5 | 0.4 | | | |
| Sweet Fennel | | 81.7 | 6.7 | 2.8 | 80.0 | 1.3 | 1.3 | | | |
| Sweet Marjoram | | 87.0 | 2.4 | 1.8 | 87.2 | 0.7 | 0.6 | 87.5 | 0.6 | 0.5 |
| Dill | | 76.2 | 4.5 | 1.7 | 84.0 | 1.5 | 1.3 | | | |
| Sage | | 95.8 | 3.3 | 1.0 | 99.0 | 2.0 | 0.9 | | | |
| Parsley B | 20–30 | 90.5 | 7.3 | 1.9 | 89.5 | 1.7 | 0.9 | 89.0 | 2.0 | 0.9 |
| Broccoli M | 15 | 99.5 | 2.3 | 0.3 | 98.4 | 1.0 | 0.5 | 9.5 | 1.8 | 0.6 |
| Broccoli A | 15 | 99.8 | 2.3 | 0.4 | 100.0 | 0.5 | 0.2 | 100.0 | 1.4 | 0.4 |
| Tomato V | 15 | 98.3 | 5.3 | 0.9 | 97.5 | 1.6 | 0.5 | 98.5 | 3.8 | 0.8 |
| Tomato R | 15 | 91.0 | 5.4 | 1.6 | 86.0 | 2.2 | 1.1 | 89.0 | 4.1 | 1.0 |
| Leek G | 15 | 92.8 | 4.2 | 1.1 | 96.0 | 0.8 | 0.8 | 92.3 | 1.9 | 0.6 |
| Pepper M95 | 20–30 | 94.3 | 5.6 | 0.8 | 95.0 | 0.9 | 1.1 | 96.5 | 1.5 | 1.3 |
| Pepper M73 | 20–30 | 94.8 | 5.4 | 1.4 | 82.5 | 1.1 | 1.2 | 89.5 | 1.6 | 1.2 |
| Pepper KRG | 20–30 | 99.3 | 4.5 | 1.4 | 98.0 | 0.7 | 0.6 | 98.7 | 1.5 | 0.6 |
| Pansy U | 20 | 91.0 | 5.0 | 2.1 | | | | 83.4 | 2.1 | 0.9 |
| Primula P | 15 | 77.8 | 9.0 | 2.1 | | | | 90.0 | 5.3 | 3.3 |
| Geranium C | 15 | 71.1 | 4.8 | 2.0 | 80.0 | 1.0 | 1.0 | 78.0 | 2.7 | 1.6 |
| Cyclamen R | 15 | 89.0 | 12.4 | 2.4 | 94.0 | 5.5 | 1.7 | 85.3 | 5.9 | 2.0 |
| Celery V | 20 | 87.8 | 6.8 | 1.9 | 92.8 | 1.0 | 0.8 | 90.5 | 2.9 | 2.0 |

* = days to germination

TABLE 1

Priming conditions for fresh and dried primed seeds of a range of species at 15° C.

| Species | Cultivar | Fresh seed Potential MPa | Days | Dry seed Potential MPa | Days |
|---|---|---|---|---|---|
| Coriander | | −1.6 | 14 | | |
| Sweet Fennel | | −1.6 | 14 | | |
| Sweet Marjoram | | −1.7 | 9 | −1.7 | 9 |
| Dill | | −1.2 | 14 | | |
| Sage | | −1.5 | 14 | | |
| Parsley | Bravour | | | | |
| Broccoli | Marathon | −0.6 | 4 | −1.0 | 4 |
| Broccoli | Arcadia | −0.8 | 5 | −1.0 | 5 |
| Tomato | Vibelco | −0.6 | 9 | −0.6 | 9 |
| Tomato | Rosella | −0.6 | 9 | −0.9 | 9 |
| Leek | Gavia | −1.4 | 12 | −1.4 | 12 |
| Pepper | Maestro 95 | −0.9 | 18 | −0.9 | 18 |
| Pepper | Maestro 73 | −0.9 | 18 | −0.9 | 18 |
| Pepper | Keystone RG | −1.0 | 14 | −1.0 | 14 |
| Pansy | Universal | | | −1.0 | 9 |
| Primula | Paloma | | | −1.2 | 14 |
| Geranium | Colorama | −1.2 | 10 | −1.4 | 10 |
| Cyclamen | Rubin | −1.2 | 21 | | |
| Celery | Victoria | −1.0 | 14 | −1.4 | 14 |

As the present method may be used by large plant raisers for raising plants under glass, a situation where production follows a fixed plan and is not interrupted by bad weather, it was possible to consider use of undried, i.e. fresh-primed Thus it can be seen from these results that dried Primula seeds have been provided that are capable of germinating in six days or less while dried Pansy seeds obtained are capable of germinating in 60 hours or less.

EXAMPLE 4

Germination method of the invention.

The method of Example 3 is used but the period for which the seed is treated is increased until at least some of the seeds show signs of radicle emergence. Seeds are then transferred to a seed classifying device of the type described by Kirin Brewery in JETRO May 1994 that has been adapted by provision of hollow projections from the rotating classifier drum. These hollow projections are dimensioned such as to have a distal end diameter less than the diameter of the seed and carry suction generated by the blower such as to be capable of retaining the seed as the drum rotates past a seed reception zone.

The drum carried seeds are presented to a CCD camera which is used to provide a signal or set of signals indicative of seed size and colour which is in turn used to classify seeds as germinated or ungerminated. Seeds classified as ungerminated are ejected by the reject nozzle and recycled to the priming treatment of Example 3, while those classified as germinated are ejected at separate position, eg. by the scraper brush, and further processed, eg. dried back, coated or rendered desiccation tolerant, by treatment in a drum device of the invention which utilises a solution of predetermined osmotic potential such as to produce a seed water content between 35 and 55% by weight.

The criterion for classification of seed as germinated will conveniently include the presence of a lighter colour visible on the seed surface due to emergence of the radicle. The appropriate level of colour difference may conveniently be determined by eg. discriminant analysis using seed of known germination status to set threshold values with a computer processor computing these for store in a memory device as is known in the optical classifier art.

We claim:

1. A method of treating a seed to effect control of its water content comprising contacting the seed with a first surface of a semi-permeable membrane (2) having first and second surfaces, the second surface being in direct contact with a solution of predetermined osmotic potential, such that the seed abstracts water from the solution through the membrane (2), wherein the seed and semi-permeable membrane are constantly or periodically caused to move relative to each other such as to constantly or periodically reorient the seed with respect to the first surface such that the transfer of water occurs evenly over substantially the entire surface area of the seed.

2. A method as claimed in claim 1 wherein the method comprises supplying the seed with water in controlled fashion.

3. A method as claimed in claim 1 characterised in that it is a method for priming a seed, wherein the osmotic pressure and the period for which the seed is maintained in contact with the membrane are sufficient to allow pre-germinative metabolic processes to take place within the seed up to any level up to that immediately preceding radicle emergence.

4. A method as claimed in claim 1 characterised in that it is a method for germinating a seed, wherein the osmotic pressure and the period for which the seed is maintained in contact with the membrane (2) are sufficient to allow pre-germinative metabolic processes to take place within the seed at least up to radicle emergence.

5. A method as claimed in claim 1 characterised in that it is a method for inducing desiccation tolerance in a seed, wherein the osmotic pressure and the period for which the seed is maintained in contact with the membrane (2) are sufficient to produce a seed water level insufficient to support radicle growth but sufficiently high to permit other metabolic processes to continue.

6. A method as claimed in claim 5 wherein the seed water level produced is from 35% to 55% by weight of the seed.

7. A method as claimed in claim 1 wherein the semi-permeable membrane (2) is provided in the form of a tube of circular or polygonal cross-section which is rotated with the seed on its inner surface and the solution retained between its outer surface and a further body (3) to which the membrane is sealed in a watertight manner or of which the membrane is an integral part.

8. A method as claimed in claim 7 wherein the semi-permeable membrane (2) is such that, when the tube outer surface is contacted with solution, the tube inner surface visibly appears to be dry.

9. A method as claimed in claim 8 wherein only the contact of the seeds, or some other absorbent body, with the first surface results in transfer of water to the first side.

10. A method as claimed in claim 9 wherein the tube is provided with end caps (4)(4a)(4b).

11. A method as claimed in claim 1 wherein the semi-permeable membrane is located on a frame (1) within a drum device such that it divides the drum device into inner and outer chambers (6)(5) which are isolated with respect to water transfer between the two other than by through the semi-permeable membrane (2) itself.

12. A method as claimed in claim 11 wherein the second chamber is completed by one or more other non-permeable wall elements including that/those upon which the semi-permeable membrane tube is mounted.

13. A method as claimed in claim 1 wherein the semi-permeable membrane is made from any material that is permeable to water but impermeable to the solution of predetermined osmotic pressure.

14. A method as claimed in claim 1 wherein the semi-permeable membrane is made from cellulose and/or polycarbonate materials suitable for dialysis.

15. A method as claimed in claim 7 wherein the tube is rotated at about 0.8 to 1.2 rpm and the outer drum diameter is about 110 mm.

16. A method as claimed in claim 1 wherein the osmotic potential of the solution is between −0.5 to −2.0 MPa.

17. A method as claimed in claim 1 characterised in that it is carried out at between 10° and 25° C.

18. An apparatus for treating a seed to effect control of its water content comprising a semi-permeable membrane (2) having first and second surfaces, the first surface adapted to be in contact with seed to be treated in use, together with a chamber (5) adapted to contain a solution of predetermined osmotic potential such as to contact the second surface, whereby in use the seeds are able to abstract water from the solution through the membrane and wherein the apparatus is adapted such that in use the first surface and seed may be caused to move relative to each other such that the seed is periodically or constantly reorientated with respect to the first surface whereby the transfer of water takes place evenly over its entire surface area.

19. An apparatus as claimed in claim 18 wherein the semi-permeable membrane (2) is provided in the form of a tube of circular or polygonal cross-section which is rotatable such as to be capable of carrying the seeds on its inner surface with the solution retained in the chamber (5) which is formed between its outer surface and a further body to which the membrane is sealed in a watertight manner.

20. An apparatus as claimed in claim 19 wherein the semi-permeable membrane is such that, when the tube outer surface is contacted with solution, the tube inner surface appears to be dry.

21. An apparatus as claimed in claim 20 wherein only the contact of the seeds, or some other absorbent body, with the first surface results in transfer of water to the first side.

22. An apparatus as claimed claim 18 wherein the tube is provided with end caps (4)(4a)(4b).

23. An apparatus as claimed in claim 18 wherein the semi-permeable membrane (2) is located on a frame (1) within a drum device such that it divides the drum device into inner and outer chambers (6)(5) which are isolated with respect to water transfer between the two other than through the semi-permeable membrane (2) itself.

24. An apparatus as claimed in claim 23 wherein the outer chamber is completed by other non-permeable wall elements including those upon which the semi-permeable membrane tube is mounted.

25. An apparatus as claimed in 18 wherein the semi-permeable membrane (2) is made from a material that is permeable to water but impermeable to the solution of predetermined osmotic pressure.

26. An apparatus as claimed in claim 18 wherein the semi-permeable membrane is made from cellulose and/or polycarbonate materials suitable for dialysis.

27. An apparatus as claimed in claim 18 wherein the tube is mounted in a drum device which is mountable in a roller frame such that it may be driven to rotate.

28. A method as claimed in claim 4 wherein the seed from the treatment is passed to a seed classifier and classified as germinated or ungerminated.

29. An apparatus as claimed in claim 18 further comprising a drive means for rotating the semi-permeable membrane tube about its horizontally oriented longitudinal axis.

30. An apparatus as claimed in claim 29 wherein the drive means comprises a driven roller frame.

31. An apparatus as claimed in claim 4 further comprising a seed classifier device.

* * * * *